United States Patent
Tang et al.

(10) Patent No.: US 9,733,733 B2
(45) Date of Patent: Aug. 15, 2017

(54) MAGNETIC ATTRACTIVE CAPACITIVE STYLUS

(71) Applicant: WALTOP INTERNATIONAL CORPORATION, Hsinchu (TW)

(72) Inventors: Ying Hwa Tang, Hsinchu (TW); A-Li Wong, Hsinchu (TW)

(73) Assignee: Waltop International Corporation, Hsinchu (TW)

( * ) Notice: Subject to any disclaimer, the term of this patent is extended or adjusted under 35 U.S.C. 154(b) by 7 days.

(21) Appl. No.: 14/931,654

(22) Filed: Nov. 3, 2015

(65) Prior Publication Data

US 2017/0108952 A1   Apr. 20, 2017

(30) Foreign Application Priority Data

Oct. 16, 2015  (TW) .............................. 104216562 U

(51) Int. Cl.
   *G06F 3/0354*   (2013.01)
(52) U.S. Cl.
   CPC ................................ *G06F 3/03545* (2013.01)
(58) Field of Classification Search
   CPC ....... G06F 3/03545; G06F 3/044; G06F 3/038
   USPC ....................................................... 345/179
   See application file for complete search history.

(56) References Cited

U.S. PATENT DOCUMENTS

| | | | | |
|---|---|---|---|---|
| 5,594,215 A | * | 1/1997 | Jeng ........................ | G06F 3/038 178/18.07 |
| 2013/0106723 A1 | * | 5/2013 | Bakken ............... | G06F 3/03545 345/173 |
| 2015/0022487 A1 | * | 1/2015 | Kuo .................... | G06F 3/03545 345/174 |
| 2015/0130772 A1 | * | 5/2015 | Katsurahira ............ | G06F 3/044 345/179 |
| 2015/0145836 A1 | * | 5/2015 | Katsurahira ........ | G06F 3/03545 345/179 |

* cited by examiner

*Primary Examiner* — Fred Tzeng
(74) *Attorney, Agent, or Firm* — Donald E. Stout; Stout, Uxa & Buyan, LLP

(57) ABSTRACT

A capacitive stylus, as an inputting device of a touch sensitive device, comprises a control circuit for emitting signals to the touch sensitive device, a power for providing electricity to the control circuit, two charging rings electrically connecting to the power, and a first magnetic member having a first magnetic pole and a magnetic second pole. The touch sensitive device comprises a recess for placing the capacitive stylus, two charging pads arranged within the recess for connecting with the two charging rings, a charging circuit for charging the power of the capacitive stylus via the two charging pads, and a second magnetic member having a first magnetic pole and a second magnetic pole. The first magnetic member and the second magnetic member assure the charging operation can be correctly proceeded.

11 Claims, 5 Drawing Sheets

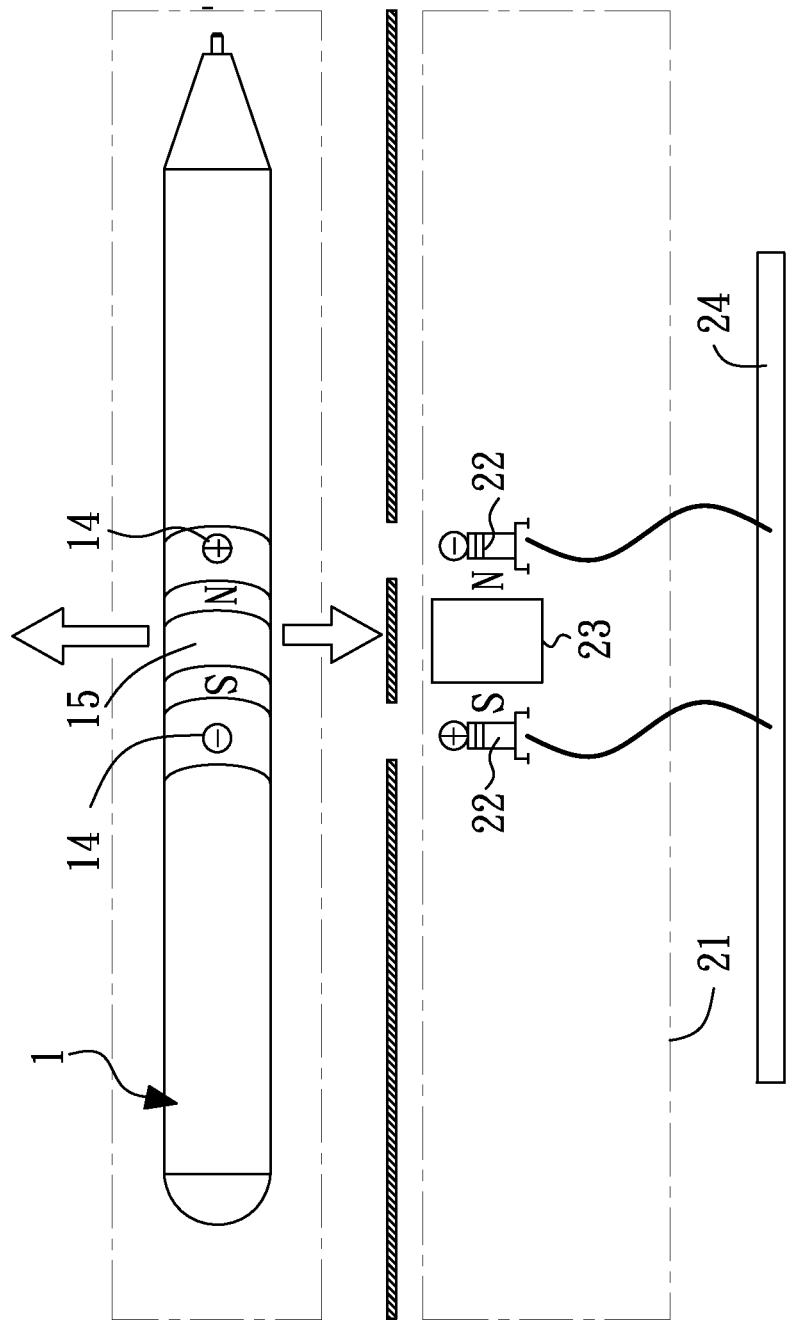

MAGNETIC ATTRACTIVE CAPACITIVE STYLUS

CROSS-REFERENCE TO RELATED APPLICATIONS

The entire contents of Taiwan Patent Application No. 104216562, filed on Oct. 16, 2015, from which this application claims priority, are expressly incorporated herein by reference.

BACKGROUND OF THE INVENTION

1. Field of the Invention

The present invention relates to an inputting device, and more particularly relates to a magnetic attractive capacitive stylus.

2. Description of Related Art

Touch sensitive devices are becoming increasingly popular because of their ease and versatility of operation. A touch sensitive device can generally allow a user to perform various functions by touching or hovering over its panel using one or more fingers. The touch sensitive device recognizes a touch event and the position of the touch event on the panel, and then interprets the touch event, and thereafter performs one or more operations based on the touch event.

Dictating by one or more fingers, however, may be inconvenient or limited for some situations and people. For example, writing on the screen by one or more fingers may be inconvenient for some people. A capacitive stylus is therefore developed for helping the user to operate the touch sensitive device.

Typically the capacitive styluses have a battery and a battery charger is provided to charge the battery.

SUMMARY OF THE INVENTION

In one general aspect, the present invention relates to a magnetic attractive capacitive stylus allowing the user to correctly recharge the capacitive stylus by a touch sensitive device.

In an embodiment of the present invention, a capacitive stylus is provided as an inputting device of a touch sensitive device. The capacitive stylus comprises a tip, a control circuit, a power, two charging rings, and a first magnetic member. The tip is used for writing on a screen of the touch sensitive device. The control circuit is used for emitting a signal to the touch sensitive device. The power provides electricity to the control circuit. The two charging rings electrically connect with the power. The first magnetic member is arranged near to the two charging rings and has a first magnetic pole and a second magnetic pole. The touch sensitive device comprises a recess, two charging pads, a charging circuit, and a second magnetic member. The recess is used for placing the capacitive stylus. The two charging pads are used for contacting with the two charging rings. The charging circuit is used for charging the power of the capacitive stylus via the two charging pads. The second magnetic member is arranged near to the two charging pads and has a first magnetic pole and a second magnetic pole.

In an embodiment, the touch sensitive device is a mobile phone.

In an embodiment, the touch sensitive device is a tablet personal computer.

In an embodiment, the power is a rechargeable battery.

In an embodiment, the power is a supercapacitor.

In an embodiment, the first magnetic member is a magnet

In an embodiment, the second magnetic member is a magnet.

In an embodiment, the two charging pads are two elastic contact fingers.

In an embodiment, the first magnetic member is arranged between the two charging rings.

In an embodiment, the second magnetic member is arranged between the two charging pads.

In an embodiment, the capacitive stylus can be placed into the recess of the touch sensitive device and can be recharged when the first magnetic pole of the first magnetic member is toward the second magnetic pole of the second magnetic member and the second magnetic pole of the first magnetic member is toward the first magnetic pole of the second magnetic member.

BRIEF DESCRIPTION OF THE DRAWINGS

FIGS. 3A and 3B illustrates the charging operation between a capacitive stylus and a touch sensitive device according to an embodiment of the present invention.

DETAILED DESCRIPTION OF THE PREFERRED EMBODIMENT

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not been described in detail in order not to unnecessarily obscure the present invention. While drawings are illustrated in details, it is appreciated that the quantity of the disclosed components may be greater or less than that disclosed, except expressly restricting the amount of the components. Wherever possible, the same or similar reference numbers are used in drawings and the description to refer to the same or like parts.

Figure 1:
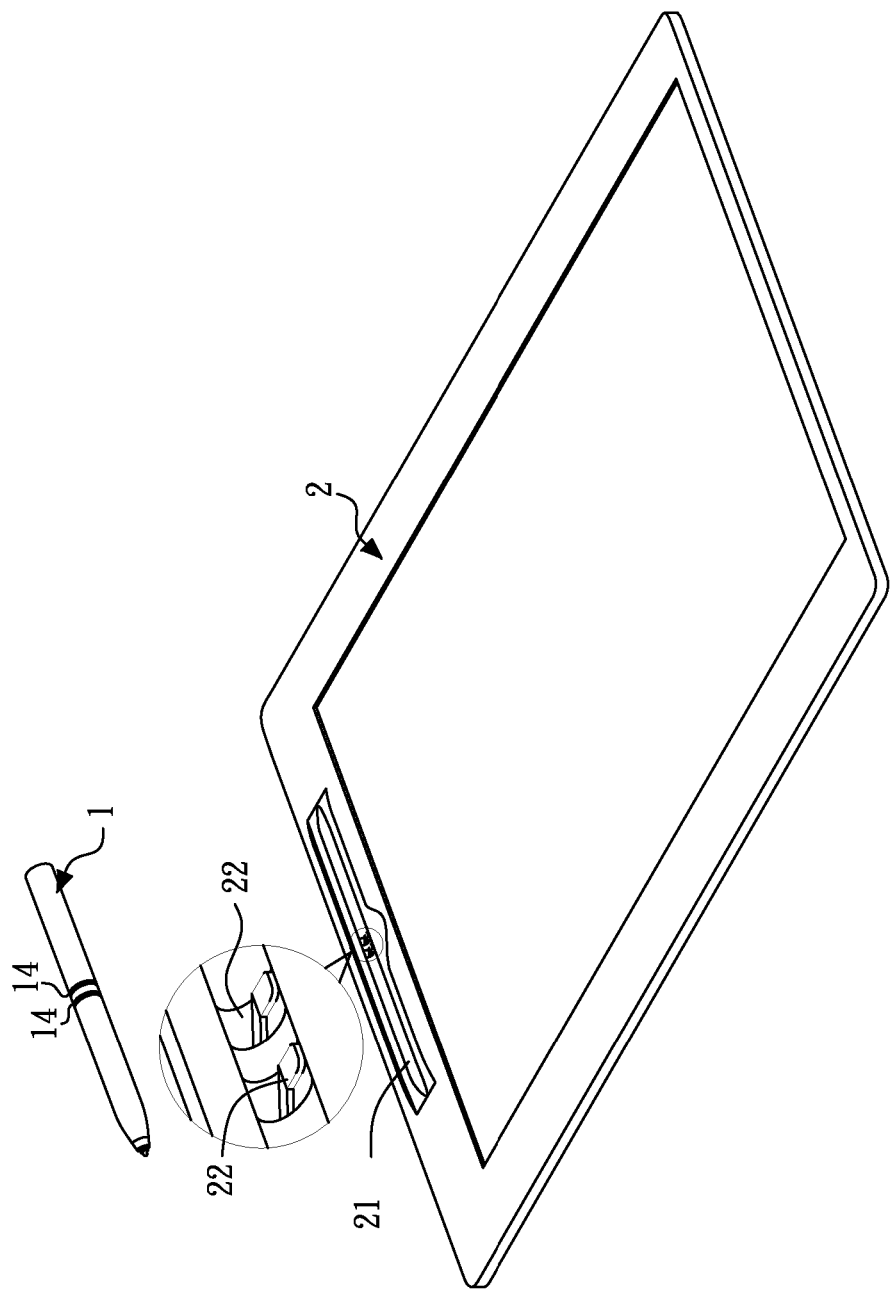
FIG. 1 is a perspective view showing a capacitive stylus and a touch sensitive device according to an embodiment of the present invention.
Figure 2:
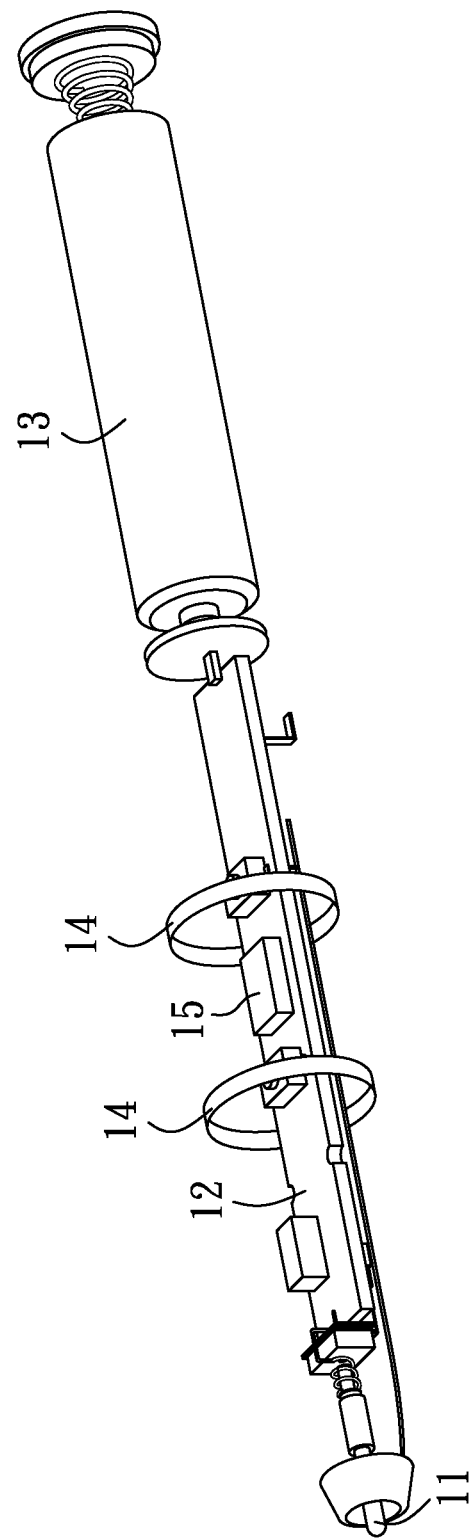
FIG. 2 is a perspective view showing the major components of a capacitive stylus according to an embodiment of the present invention.

FIG. 1 is a perspective view showing a capacitive stylus 1 and a touch sensitive device 2 according to an embodiment of the present invention. FIG. 2 is a perspective view showing the major components of a capacitive stylus 1 according to an embodiment of the present invention. Referring to FIGS. 1 and 2, the capacitive stylus 1 can be charged by the touch sensitive device 2. In this preferred embodiment, the capacitive stylus 1 is used as an inputting device of the touch sensitive device 2, such as a mobile phone, a tablet personal computer, or the likes. The touch sensitive device 2 may include a touch screen or include in-cell photo sensors, so that the touch events and touch positions of the user can be detected. In an embodiment of the present invention, the touch sensitive device 2 includes, but is not limited to, a capacitive touch screen.

Referring to FIGS. 1 and 2, the capacitive stylus 1 comprises a tip 11, a control circuit 12, a power 13, two charging rings 14, and a first magnetic member 15. The tip 101 can be used for writing on a screen of the touch sensitive device 2, and the control circuit 12 can emit a signal via the tip 101 or via other electrodes, so that the touch sensitive device 2 receives the signal and performs one or more operations according to the signal. The power 13 provides electricity to the control circuit 12. The two charging rings 14 electrically connect with the control circuit 12 and/or the power 13, and the power 13 can be recharged by the external power source. The first magnetic member 15 is arranged near to the two charging rings 14 and has a first magnetic pole and a second magnetic pole, such as a north magnetic pole and a south magnetic pole.

In the preferred embodiment, the touch sensitive device 2 is a mobile phone or a tablet personal computer. In an embodiment of this invention, the power 13 is a rechargeable battery. In another embodiment of this invention, the power 13 is a supercapacitor (ultracapacitor). In the preferred embodiment of this invention, the first magnetic member 15 is a magnet. In the preferred embodiment of this invention, the first magnetic member 15 is arranged between the two charging rings 14. In another embodiment of this invention, the number of the charging ring 14 could be more than two, and the charging ring 14 may have other configurations instead of ring-shaped configuration.

Figure 3A:
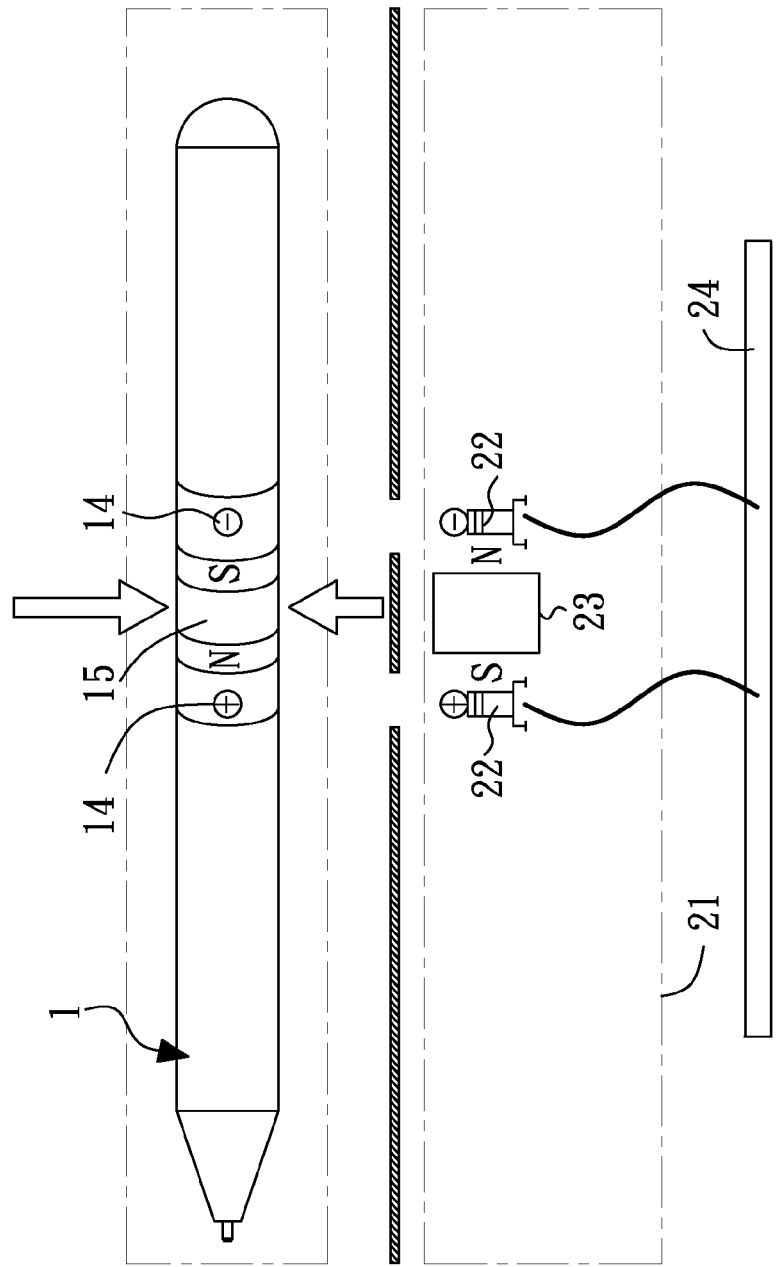

FIGS. 3A and 3B illustrate the charging operation between the capacitive stylus 1 and the touch sensitive device 2. Referring to FIGS. 1, 3A, and 3B, the touch sensitive device 2 comprises, but is not limited to, a recess 21, two charging pads 22, a second magnetic member 23, and a charging circuit 24. The recess 21 is used to place the capacitive stylus 1. The two charging pads 2 are used to connect (contact) with the two charging rings 14. The charging circuit 24 can charge the power 13 of the capacitive stylus 1 through the two charging pads 22. The second magnetic member 23 is arranged near to the two charging pads 22, and has a first magnetic pole and a second magnetic pole, such as a north magnetic pole and a south magnetic pole.

In the preferred embodiment of this invention, the second magnetic member 23 is a magnet. In a preferred embodiment of this invention, the second magnetic member 23 is arranged between the two charging pads 22.

Referring to FIG. 3A, when the user wants to charge the power 13 of the capacitive stylus 1, he or she may put the capacitive stylus 1 into the recess 21. If the direction of the capacitive stylus 1 is correct, i.e., the north magnetic pole of the first magnetic member 15 being toward the south magnetic pole of the second magnetic member 23 and the south magnetic pole of the first magnetic member 15 being toward the north magnetic pole of the second magnetic member 23, then a magnetic attractive force is generated between the first magnetic member 15 and the second magnetic member 23. Therefore, the capacitive stylus 1 can be drawn into the recess 22 by the magnetic attractive force, resulting in the positive electrode of the two charging rings 14 of the capacitive stylus 1 contacts with the positive electrode of the two charging pads 22 of the touch sensitive device 2, and the negative electrode of the two charging rings 14 of the capacitive stylus 1 contacts with the negative electrode of the two charging pads 22 of the touch sensitive device 2, so that the charging operation can be proceed.

Referring to FIG. 3B, when the user wants to charge the power 13 of the capacitive stylus 1, he or she may put the capacitive stylus 1 in the recess 21. If the direction of the capacitive stylus is wrong, i.e., the north magnetic pole of the first magnetic member 15 being toward the north magnetic pole of the second magnetic member 23 and the south magnetic pole of the first magnetic member 15 being toward the south magnetic pole of the second magnetic member 23, then a magnetic repulsive force is generated between the first magnetic member 15 and the second magnetic member 23. Therefore, the capacitive stylus 1 cannot be placed into the recess 22 due to the magnetic repulsive force.

Figure 4:
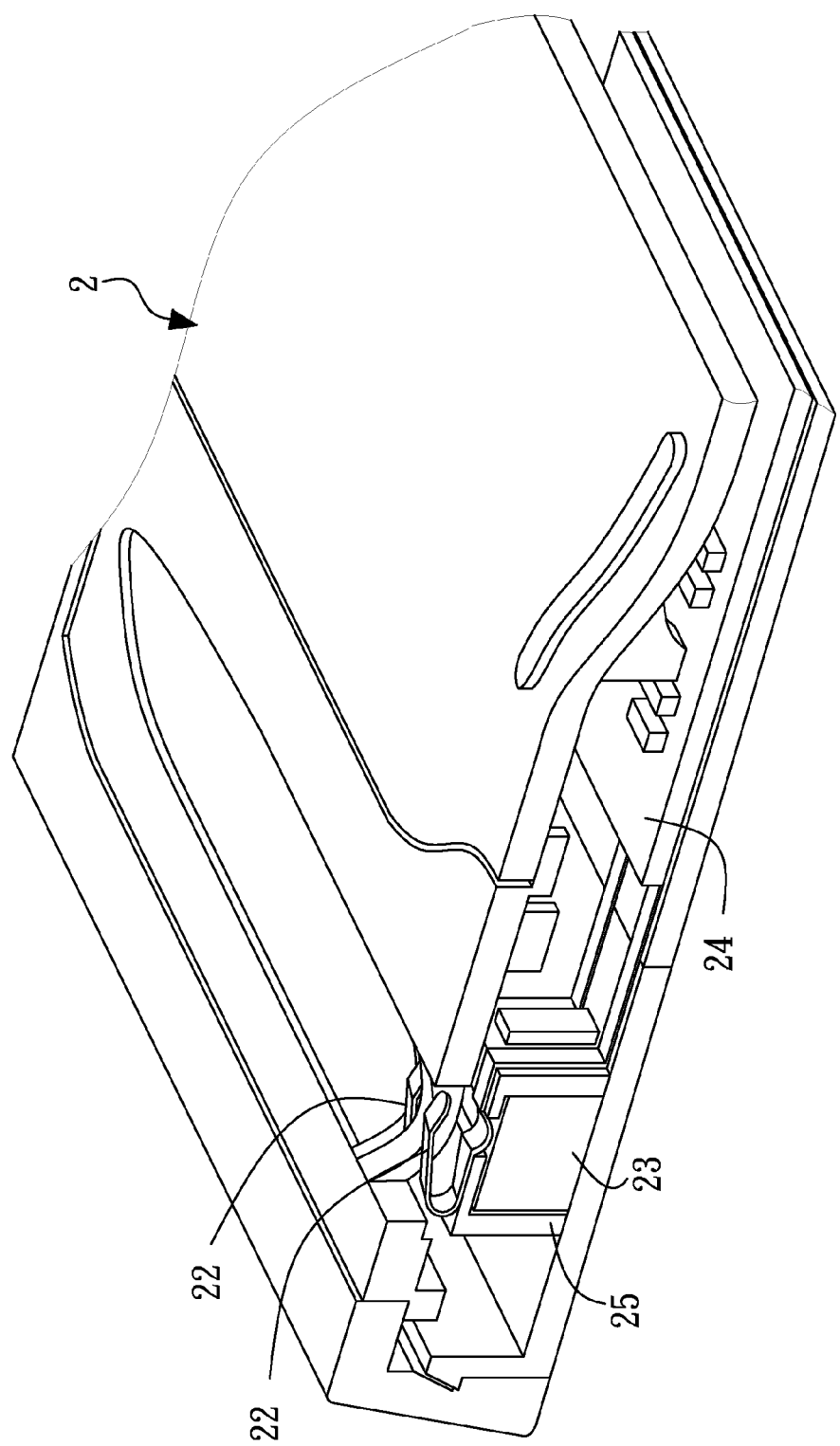
FIG. 4 is a partially enlarged view showing a touch sensitive device according to an embodiment of the present invention.

FIG. 4 is a partially enlarged cross-sectional view showing the touch sensitive device 2 according to an embodiment of the present invention. In this embodiment, the two charging pads 22 are two elastic contact fingers 22. The two elastic contact fingers 22 electrically connect with the charging circuit 24. When the two elastic contact fingers 22 correctly contact with the two charging rings 14 of the capacitive stylus 1, the charging circuit 24 can charge the power 13 of the capacitive stylus 1.

Referring to FIG. 4, in this embodiment, the touch sensitive device 2 further comprises a covering 25, and the second magnetic member 23 is arranged within the covering 25. In addition, the two charging pads 22 are arranged on the covering 25.

Because the capacitive stylus 1 includes at least two charging rings 14 and a first magnetic member 15, and the touch sensitive device includes at least two charging pads 22 and a second magnetic member 23. The magnetic attractive force or the magnetic repulsive force between the first magnetic member 15 and the second magnetic member 23 can assure the charging operation can be correctly proceeded.

The intent accompanying this disclosure is to have each/all embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention. Corresponding or related structure and methods disclosed or referenced herein, and/or in any and all co-pending, abandoned or patented application(s) by any of the named inventor(s) or assignee(s) of this application and invention, are incorporated herein by reference in their entireties, wherein such incorporation includes corresponding or related structure (and modifications thereof) which may be, in whole or in part, (i) operable and/or constructed with, (ii) modified by one skilled in the art to be operable and/or constructed with, and/or (iii) implemented/made/used with or in combination with, any part(s) of the present invention according to this disclosure, that of the application and references cited therein, and the knowledge and judgment of one skilled in the art.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

All of the contents of the preceding documents are incorporated herein by reference in their entireties. Although the disclosure herein refers to certain illustrated embodiments, it is to be understood that these embodiments have been presented by way of example rather than limitation. For example, any of the particulars or features set out or referenced herein, or other features, including method steps and techniques, may be used with any other structure(s) and process described or referenced herein, in whole or in part, in any combination or permutation as a non-equivalent, separate, non-interchangeable aspect of this invention. Corresponding or related structure and methods specifically contemplated and disclosed herein as part of this invention, to the extent not mutually inconsistent as will be apparent from the context, this specification, and the knowledge of one skilled in the art, including, modifications thereto, which may be, in whole or in part, (i) operable and/or constructed with, (ii) modified by one skilled in the art to be operable and/or constructed with, and/or (iii) implemented/made/used with or in combination with, any parts of the present invention according to this disclosure, include: (I) any one or more parts of the above disclosed or referenced structure and methods and/or (II) subject matter of any one or more of the inventive concepts set forth herein and parts thereof, in any permutation and/or combination, include the subject matter of any one or more of the mentioned features and aspects, in any permutation and/or combination.

Although specific embodiments have been illustrated and described, it will be appreciated by those skilled in the art that various modifications may be made without departing from the scope of the present invention, which is intended to be limited solely by the appended claims.

What is claimed is:

1. A capacitive stylus and a touch sensitive device, the capacitive stylus usable as an inputting device of the touch sensitive device, the capacitive stylus comprising:
   a tip for writing on a screen of the touch sensitive device;
   a control circuit for emitting a signal to the touch sensitive device; and
   a power providing electricity to the control circuit;
   two charging rings electrically connecting with the power; and
   a first magnetic member being arranged near to the two charging rings and having a first magnetic pole and a second magnetic pole; and
   the touch sensitive device comprising:
   a recess for placing the capacitive stylus;
   two charging pads being arranged within the recess for contacting with the two charging rings;
   a charging circuit for charging the power of the capacitive stylus via the two charging pads; and
   a second magnetic member being arranged near to the two charging pads and having a first magnetic pole and a second magnetic pole, and wherein the first magnetic member and the second magnetic member are used to ensure placement of the capacitive stylus in the recess in a correct direction.

2. The capacitive stylus and the touch sensitive device of claim 1, wherein the touch sensitive device is a mobile phone.

3. The capacitive stylus and the touch sensitive device of claim 1, wherein the touch sensitive device is a tablet personal computer.

4. The capacitive stylus and the touch sensitive device of claim 1, wherein the power is a rechargeable battery.

5. The capacitive stylus and the touch sensitive device of claim 1, wherein the power is a supercapacitor.

6. The capacitive stylus and the touch sensitive device of claim 1, wherein the first magnetic member is a magnet.

7. The capacitive stylus and the touch sensitive device of claim 1, wherein the second magnetic member is a magnet.

8. The capacitive stylus and the touch sensitive device of claim 1, wherein the two charging pads are two elastic contact fingers.

9. The capacitive stylus and the touch sensitive device of claim 1, wherein the first magnetic member is arranged between two charging rings.

10. The capacitive stylus and the touch sensitive device of claim 1, wherein the second magnetic member is arranged between two charging pads.

11. The capacitive stylus and the touch sensitive device of claim 1, wherein the capacitive stylus can be placed into the recess of the touch sensitive device and can be recharged when the first magnetic pole of the first magnetic member is toward the second magnetic pole of the second magnetic member and the second magnetic pole of the first magnetic member is toward the first magnetic pole of the second magnetic member.

* * * * *